UNITED STATES PATENT OFFICE.

JOHAN H. NORRBIN AND JOHAN OHLSSON, OF STOCKHOLM, SWEDEN, ASSIGNORS TO ALARIK LIEDBECK, OF SAME PLACE.

IMPROVEMENT IN EXPLOSIVE COMPOUNDS.

Specification forming part of Letters Patent No. 141,585, dated August 5, 1873; application filed October 4, 1872.

*To all whom it may concern:*

Be it known that we, JOHAN HENRIK NORRBIN and JOHAN OHLSSON, both of Stockholm, Sweden, have invented a new and useful composition of matter, to wit., an Explosive Compound, of which the following is a specification:

It is a well-known fact that the nitrate and nitrite of ammonia, whether mixed or not with combustible substances, are but slowly decomposed in contact with fire, as usually applied, and have never, prior to our invention, been utilized as explosive agents. But, by submitting the above-named substances to the influence of the intensely hot and dense atmosphere evolved by an explosion, we have succeeded in causing them to decompose so rapidly as to explode or detonate, thereby producing great power. To obtain that result we grind very fine the above-mentioned salts of ammonia and mix them intimately with a fulminate, such as nitro-glycerine, nitro-mannite, or picrate of potash. We, however, prefer nitro-glycerine, on account of its liquid form, which gives to each grain of ammonia powder a coating of fulminate.

If nitrite of ammonia is used it is simply mixed with the fulminate. We, however, prefer, on account of its greater power, the nitrate of ammonia; but to utilize its richness in oxygen, we mix it with from seven and a half to fifteen per cent. of coal, or a corresponding quantity of any other combustible material, such as sugar, resin, sulphur, &c.

Practically, about the best composition is formed by mixing intimately thirty parts by weight of nitrate of ammonia with six to eight parts by weight of coal, both powdered very fine, and then adding from ten to twenty parts by weight, (more or less, according as increasd power and quickened detonation may be desirable for the purpose in view,) of nitro-glycerine, which is well mixed with the other ingredients, which should be moistened throughout by the explosive liquid. The whole then presents the appearance of a somewhat pasty mass, which may be formed into cartridges or used otherwise.

It is fired by a strong percussion-cap affixed to the end of a fuse, the mode usually applied for setting off nitro-glycerine, dynamite, or gun-cotton.

Having thus described our invention, what we claim as new, and desire to secure by Letters Patent, is—

An explosive compound, consisting of nitrate or nitrite of ammonia and a fulminate, as set forth.

In testimony whereof we have signed our names to this specification in the presence of two suscribing witnesses.

J. H. NORRBIN.
JOH. OHLSSON.

Witnesses:
WM. AUBIGNÉ,
HANS F. ERICSSON.